United States Patent Office 3,447,366
Patented June 3, 1969

3,447,366
PROCESS OF DETERMINING DIMENSIONS AND PROPERTIES OF CUTTING EDGES OF MOLECULAR DIMENSIONS
Humberto Fernandez Moran Villalobos, 5807 Dorchester Ave., Chicago, Ill. 60637
No Drawing. Filed June 22, 1965, Ser. No. 466,877
Int. Cl. G01n 19/02
U.S. Cl. 73—104                       11 Claims

ABSTRACT OF THE DISCLOSURE

The dimensions and properties of ultrasharp cutting edges and in particular the edges of diamond knives are determined by (a) direct microscopic examination with magnification ranging from that of light microscopy to electron microscopy, (b) electron optical examination of surface characteristics of the cutting edge facets, (c) using edge to cut ultrathin sections of selected specimens and microscopically examining the section and cut surface of the specimen, (d) pressing edge into selected thin film of plastic material and microscopically examining the indentation formed and (e) mounting the cutting tool in a highly evacuated or gas filled tube with the edge as an emitter of ions or electrons to produce field-ion or field-electron emission image of the edge on a fluorescent screen.

---

It is widely recognized that ultrasharp diamond knives and associated ultramicrotomy apparatus of the type developed and systematically introduced in research laboratories and in industry by the applicant (References 1, 2, 3, 4) have considerably advanced the state of prior art in the preparation of very thin slices of materials, and in ultraprecision machining (5). His pioneering work in this specialized field has resulted in the production of the highest quality metal surfaces presently attainable with finishes and tolerances in the low-microinch range.

This unprecedented, readily attainable microinch accuracy is now achieved directly by continuous turning operation using the diamond knife, without the traditional time-consuming and very costly additional work of lapping, buffing or polishing (5).

The cutting-edge sharpness radius of the order of 0.10 microinch, and the regularity of the diamond knife cutting edge are of decisive importance for this purpose, as compared with the measured cutting-edge radius of well-sharpened conventional tools which is about 300 microinches (6). As shown by careful studies, this far greater cutting-edge radius and irregularity of the best standard tools results in the production of high frictional forces on the cutting edge which generates a poor surface finish by tearing and deforming the material plus accelerated wear and abrasion of the edge.

However, with a diamond cutting tool having an edge thickness of 0.001 to 0.01 micron results are consistently obtained that practically approach the idealized condition for optimum sectioning. Since the zone of compressive yielding and flow around the edge is reduced to a vertical length of a few microinches, more uniform flow and yielding of the material at the active tool edge is achieved with consequent improvement in the surface finish of the cut. Moreover, very precise sizing can be maintained because cut depths of only 5 to 10 microinches are readily made (5).

It is therefore essential to determine accurately the dimensions and properties of these ultrasharp cutting edges as an indispensable factor in the production and testing of the diamond knife, considered to be the most sophisticated cutting tool available today.

Prior to applicant's work in this field there were no adequate methods for direct imaging and measuring the cutting-edge sharpness radius of dimensions below the resolving power of the light microscope (0.2 to 0.4 micron). In fact, the active cutting region of our sharpest cutting tools remained "invisible" until suitable methods were devised which permitted successful application of the hundredfold higher resolving power of the electron microscope for direct observation of these submicroscopic structures. Direct visualization and precise measurement of the ultrasharp cutting edges was an integral part of applicant's research program in ultramicrotomy, and played a key role in the development of the diamond knife. The critical measurement and testing procedures for the cutting edges which have been developed in the course of this work represent the basis for a rational approach to the complex problems encountered in the new domain of ultraprecision machining and molecular sectioning.

Conversely, the possibility of working with stable cutting edges of submicroscopic dimensions, and of studying their interaction with selected specimens under controlled conditions has opened up a new field of investigation, disclosing new phenomena which are operative predominantly at the level of molecular organization.

Thus, for example, with a diamond cutting-edge sharpness radius measuring only 10 to 100 Angstrom units, which corresponds to some 6 to 60 carbon atoms strongly covalently bonded, it is actually possible to section or "cut up" certain long-chain organic polymers into their constituent chemical subunits of molecular dimensions. By using the special ultramicrotome apparatus described earlier (1, 3) operating at very low temperatures it has been possible to cut starch macromolecules into their constituent sugar molecules endowed with quite different chemical properties.

This controlled modification of molecular structures represents a new form of manipulation, extending well beyond the established definition of mechanical sectioning, and leading into the realm of a novel modality of "preparative chemistry and physical chemistry" performed under conditions of minimum perturbation in a low entropy environment. The methods described in this application were used primarily in connection with the production and testing of diamond knives; since diamond is the hardest naturally occurring material, and its crystalline structure makes it possible to reproducibly obtain stable cutting edges of molecular dimensions, using appropriate techniques and apparatus, of the type described in my Patents No. 2,961,908, No. 3,060,781, No. 3,190,044 and No. 3,190,047.

However, the measurement and testing procedures can likewise be applied to determine the sharpness and properties of the active cutting edges of all kinds of cutting tools, including glass knives for ultramicrotomy, razor (1), (2), (3), (4), (5), (6)—See notes at end of specificablades and related steel cutting edges, the wide variety of well-sharpened machine tools, and in general all cutting tools used in science, industry and technology where optimum sharpness and regularity are essential.

It should be pointed out that accurate determination of cutting-edge sharpness radius and related properties of active cutting tools is of fundamental significance as an integral part of any manufacturing or production procedure designed to systematically achieve efficient cutting tools for sectioning all types of materials, in a controlled and economic way. This difficult field has been neglected in the past, partly owing to technical limitations inherent in light microscopy. However, now that ultra-precision machining and related disciplines are assuming vital importance in an era of increased automation, which depends for its success on absolute uniformity of operation and reproducibility of the finished product, the refined measurement techniques described here are of key operational value. In many ways a similar relationship can be invoked between the improvements in measuring techniques and the subsequent spectacular advances in ultra-high vacuum technology. It was only after reliable devices and techniques for measuring ultra-high vacuum, like the Alpert gauge, became available that the whole field of attaining and monitoring ultrahigh vacuum environments came into being and could be systematically developed on a rational basis.

The invention relates generally to measurement and testing procedures for ultrasharp cutting edges. The separate steps can be carried out individually in different stages, but are best applied sequentially in systematic combination, since they are mutually supplementary, and finally yield an integrated picture of the cutting edge configuration and properties.

The procedure embodies the following distinguishing features incorporated in the successive operational stages:

(a) Direct examination of the ultrasharp cutting edge and its adjacent components, carried out step by step continuously at the different levels of magnification extending from the range of light microscopy to electron microscopy, electron diffraction and related electron optical techniques, in a non-destructive, highly accurate, and reproducible quantitative analytical way;

(b) Supplementary examination of the surface characteristics of the cutting edge facettes and relationship to the active cutting radius by electron optical examination of a special type of high resolution indentation replica especially developed for this purpose;

(c) Ultimate critical test of the performance and stability of the ultrasharp cutting edges by actual cutting of ultrathin serial sections of selected specimens, such as metals, hard crystalline substances, macromolecular materials and biological specimens with a highly ordered internal structure. The quality and properties of the cutting edge can be accurately evaluated by combined electron microscopy, electron diffraction, physical, and phsical-chemical studies of the resulting ultrathin sections and the exposed specimen block surface;

(d) In special cases, and particularly for routine monitoring and inspection of large numbers of cutting tools with ultrasharp edges, certain procedures for examinations based on the characteristic electron optical, electrical, and ion-optical properties of these cutting edges can b adapted for automated inspection on an assembly line basis.

DESCRIPTION OF PROCESS (a) Direct examination of the ultrasharp cutting-edge by high resolution light microscopy and electron microscopy, and related electron-optical techniques.—This procedure can best be illustrated by referring to a tyical example such as a diamond knife of the type described in my Patent No. 3,060,781. A representative diamond knife comprises a diamond body portion with a perfectly uniform and stable cutting edge of about 3 to 7 mm. length, and with a cutting-edge sharpness radius of about 10 to 100 angstrom units (0.001 to 0.01 micron). These diamond knives usually have facettes defining edge angles of about 40° to 50° for cutting plastic materials, and of 75° to 80° for cutting metals and other hard substances. However, contrary to certain claims, these edge angles do not define the active cutting-edge of the knife. Instead, the active cutting region is several hundred Angstrom units from the edge line, since it is built up of the regularly disposed crystalline unit layers of the diamond arranged in stable configuration to give smooth facets.

In order to carry out the first series of optical tests the diamond knife embedded in its metal support must be mounted in a specially designed holder which permits it to be very accurately positioned and oriented at preselected optimum angles for direct examination by light microscopy, and subsequently by electron microscopy. The photomicrograph of the edge taken at the highest light microscope magnifications (1000× to 2000×) shows a perfectly regular, straight and extremely smooth cutting edge facet. The actual cutting edge is not directly visible, since it lies beyond the resolving power of the ordinary light microscope. However, when examined under optimum conditions with point light sources of very high intensity (e.g. Xenon lamps, lasers, etc.) with the dark field "ultramicroscope" the active cutting edge can be faintly detected (arrows) by virtue of its light-scattering properties. This allows detection of small cracks and irregularities in the edge, but still does not permit direct imaging of the critical active cutting edge. Nevertheless, improved light microscopy techniques such as interference microscopy permit accurate determination of the general quality of the cutting edge and adjoining facet. This is especially useful when comparing the uniform contours and regular spacing of the dark interference bands indicating a perfectly plane and smooth diamond edge and facet, with the curving and irregularly distorted interference fringes corresponding to the submicroscopic irregularities of a polished steel razor edge. Following these initial observations which can be readily carried out routinely during the various steps of the final polishing of the diamond or other type of ultrasharp cutting edge, the decisive electron optical examination is carried out.

For this purpose the same holder can be used, suitably adapted for introduction into the high vacuum specimen chamber of an electron microscope. These studies require the use of a specially modified high resolution electron microscope operating at accelerating voltages of 40 to 100 kv. in most casts (also in the low voltage range of 5 to 10 kv. for certain applications), provided with a special pointed filament source with single-crystal tungsten tips of the type developed by the applicant. By means of these pointed sources highly coherent microbeam illumination (beam diameters ranging from 100 A. to 10 microns) of low energy spread and very low intensity can be used, in conjunction with suitable high or ultrahigh vacuum specimen chambers preferably cooled with liquid nitrogen or hydrogen (vacuum of the order of $10^{-6}$ to $10^{-8}$ mm. Hg) to prevent the deleterious contamination of the knife edge illumination with the electron beam. Under these optimum conditions the properly oriented cutting edge can be very clearly seen directly and photographed at electron optical magnifications ranging from 2000× to about 200,000×, with subsequent photographic enlargement to attain total magnifications of half a million to about one million diameters. With a focused electron microbeam of adequately low intensity to avoid specimen irradiation damage the electron microscope can readily be employed to produce a distinct shadow image of the diamond knife edge and supporting region, at magnifications adequate to resolve fine details of the edge in the order of a few hundred Angstroms. Imaging by reflection electron microscopy can also be readily accomplished by using oblique illumination and tilting the knife so that the incident electron beam makes a very small angle with its surface. This simple technique yields valuable data on the surface structure of the knife facet and of the active cutting edge, supplementing the results obtained by examination of the surface replicas.

However, the most important information is obtained by straightforward transmission electron microscopy with microbeam illumination at high magnifications, essentially because the active ultrasharp cutting-edge is ultrathin, and therefore it alone is electron transparent and can be selectively imaged. This remarkable effect which was discovered in the course of these studies has proved to be of extraordinary value as one of the most direct and powerful means of studying ultrasharp cutting edges at the highest electron-optical magnifications. It is readily understandable, since the ultrasharp cutting edges with a radius of merely 10 to 100 A. are built up of a relatively small number of the crystalline unit layers of diamond to form an ultrathin wedge-shaped structure which is only a few hundred Angstrom units thick, and therefore stands out selectively as an "electron transparent window" against the rest of the knife base which is electron-opaque. The fact that the ultrathin active cutting-edge of an ultrasharp cutting tool is essentially an "electron-transparent window" is of unique operational value because it permits us to study directly all structural details clearly visible in this most important region under excellent conditions which minimize specimen radiation damage. This effect is also clearly discernible when using electron diffraction techniques, since there is a well-defined transition from a reflection-type electron diffraction pattern to a "transmission electron diffraction pattern" precisely along the boundaries of the ultrathin cutting edge.

Although these characteristic electron-optical effects are most clearly recorded in diamond knife cutting-edges, they have also been observed under specially controlled conditions in other types of ultrasharp cutting edges in glass and steel razor edges, as well as other kinds of related cutting tools.

This "ultrasharp knife cutting-edge electron transmission effect" can serve as a basis for quantitative studies and selective detection of all types of cutting edges of these dimensions. After suitable calibration of the transmission electron miscroscope image or electron deffraction pattern using single-crystal graphite or epitaxially grown thin films as a standard for checking the thickness and related structural parameters, a conventional electron microscope can be readily adapted to serve as a routine monitoring and detecting device for these cutting edges of molecular thickness.

Other similar types of "molecular cutting-edge detectors" based on the selective electron-transmission effect are suitable for automated routine inspection and control of ultrasharp cutting edges on an assembly line basis. Some of these devices, which will be the subject of a separate application, are considerably simplified by making use of a collimated electron source (e.g. radioisotope $\beta$-emitter sources) suitably arranged so that the electrons selectively transmitted through the ultrathin cutting-edge are then recorded on a sensitive indicator, such as an image intensifier or photographic emulsion.

(b) Examination of ultrasharp cutting-edges by high resolution replica techniques.—Ordinary replica techniques which provide an indirect view of a surface mold or impression on thin plastic and metal films are very difficult to apply to the study of ultrasharp cutting edges, because the active cutting edge is largely obliterated or can actually be damaged during the required stripping process, and there is considerable distortion of the initial structural relationships. It was therefore necessary to develop a simple and reliable replica technique which would yield an accurate impression of the active cutting edge and adjoining knife facet suitable for examination by high resolution electron microscopy. Among the numerous variants that were developed the following "high resolution indentation-replica technique" applied preferably on thin films was found to be the most useful method for accurately determining the cutting-edge sharpness radius, and the surface detail of the adjoining knife facets, including the orientation and size of the abrasive particle tracks in the final polishing process of the ultrasharp diamond knife edges.

It is based on the precise "indentation track" of the active cutting edge which is produced by perpendicular indentation of the knife on ultrathin (about 50 to 200 A.) carbon-plastic films floating on a liquid surface or supported on a smooth soft support. The atomically smooth and perfectly plane films are produced by high-vacuum evaporation of carbon on a freshly cleaved mica surface, followed by coating with a collodion or Formvar film. The composite films are then stripped off from the mica by simple floating on water, on glycerol, or on gelatin or plastic substrates. The diamond knife or other type of ultrasharp cutting tool is mounted on a special holder connected with a sensitive balance to permit controlled ultra-low-load indentation of the smooth surface film, when the edge descends perpendicular on this ultrathin surface. The resulting indents (of which several can be made in rapid succession without damaging the sensitive knife edge) are readily visible with phase-contrast or dark-field microscopy. However, the actual active cutting edge can only be seen by direct examination of the replica (with subsequent carbon or platinum shadow-casting if necessary) by high resolution electron microscopy. The cutting-edge sharpness radius stands out clearly and can be accurately measured, allowing for the contribution of the shadowing material. Adjacent to this cutting edge replica, the individual crystalline unit layers of the diamond facet can be clearly discerned. Profiles of the cutting edge can also be studied by means of stereoscopic pairs recorded with a special tilting stage in the electron microscope.

The replica technique can be further refined by carrying out the whole procedure in an ultrahigh vacuum chamber ($10^{-7}$ to $10^{-9}$ mm. Hg) indenting a freshly prepared ultrathin carbon film evaporated directly on a cooled, clean glycerol surface, followed immediately by carbon or carbon-platinum shadow casting of the resulting indents of the ultra-sharp cutting edges. Large number of measurements performed on these replicas clearly show that the active cutting-edge sharpness radius of diamond knives are exceptionally regular with dimensions of the order of 10 to 30 A. in the best knives. Moreover, these active cutting edges are remarkably stable after prolonged use, as determined by combined application of the replica and the other measurement techniques described here.

Other variants of the replication techniques include direct evaporation of NaCl-carbon films on to the suitably oriented diamond or other ultrasharp cutting edges in an ultrahigh vacuum, followed by stripping off on an ultrafiltered water surface. "Shadowgrams" of the ultrasharp cutting-edges can also be obtained by collimated heavy metal shadow-casting of the cutting tools resting on a freshly cleaved mica surface.

(c) Determination of properties and stability of ultrasharp cutting edges by cutting of ultrathin serial sections of metals and selected specimens, followed by examination of the sections and surface of the specimen block.—All of the previously described methods give valuable data on the dimensions and configuration of the ultrasharp cutting edges, but the most critical test for their stability and performance can only be provided by actual ultrathin sectioning. For this purpose a special instrument, such as the ultramicrotome described in my Patents No. 2,961,908, and No. 3,091,144 preferably operating at very low temperatures is employed.

Metal specimens, such as single-crystals of aluminum, copper, gold, zinc, or platinum with a shaped "pyramid or cone" tip, preferably only 10 to 100 microns in diameter, are mounted on the specimen holder of the very accurate ultramicrotome with a continuously adjustable feed, and a measured reproducibility without the specimen of about ±10 A. After careful adjustment of the optimum cutting angle of the ultrasharp (diamond) knife, keeping the clearance angle as small as possible (preferably less than 1°) the thermal specimen advance is activated, and perfectly uniform serial sections are cut and collected in the form of a tenuous ribbon floating on the water (or other suitable liquid surface for low-temperature work) contained in the trough. Metal sections are ideal test specimens for the ultrasharp knives, because in contrast to the usual plastic-embedded specimens which have a tendency to "spread-out" after sectioning, the metal sections retain their original dimensions, and give a faithful reproduction of the diamond cutting edges (glass and steel knives can not be used for ultrathin sectioning of hard materials, such as germanium). It is important to bear in mind that the process of cutting a thin metal section is accompanied by a rather severe shear deformation of the section and a momentary rise in temperature, which can be as high as 300° C. when sectioning is performed at room temperature. However, when ultrathin sectioning of metals is carried out at temperatures below about −180° C. this deleterious temperature rise can be largely avoided (because of the typical high thermal conductivity, low thermal expansion and low compressibility of diamond).

The resulting ultrathin sections of metals are about 50 to 200 A., as determined by combined electron microscopy and electron diffraction studies, using control films and crystalline lamellae of known thickness for accurate calibration. The structure of the metal sections is a very sensitive indicator of the dimensions and quality of the ultrasharp cutting edges, since a "blunt" knife will result in section failure, edge deflection will result in irregular and compressed sections, etc. The corresponding block surface from which the sections have been cut exhibits an exceptional degree of finish (in the microinch range) which is superior to that obtained by any of the known mechanical polishing procedures. Nevertheless, even slight imperfections in the cutting edge show up as minute "tracks" in both sections and block surface.

One of the most sensitive criteria for determination of edge thickness and quality is provided by the preparation of ultrathin serial sections of macromolecular components and highly ordered biological tissues with a precise "built-in period" which serves as an internal calibration for the section thickness.

Thus, an ultrathin section of about 90 A. thickness as revealed in an electron micrograph of the highly regular paracrystalline lattice of individual protein molecules with a regular spacing of 80 to 90 A. It is actually possible to section a virus particle, like the tobacco mosaic virus, of molecular dimensions into two or more halves, corresponding to a section thickness of no more than 80 A.

Finally, by using the best ultrasharp cutting edges and low-temperature ultramicrotomy it has been possible to produce serial sections having molecular or sub-molecular thickness, prepared from frozen macromolecular substances. A native crystal of the enzyme catalase with a regular spacing of 90 A. has been cut into sections which are about 100 A. thick; another catalase crystal has been sectioned into slices of about 45 A. thickness. This can only be directly visualized by high resolution electron microscopy when working with extremely thin sections of these molecular dimensions.

An even more sensitive criterion for cutting tool sharpness can be obtained by sectioning long-chain polymers such as starch into their constituent sugar molecules, as mentioned previously. This true "molecular sectioning" results in characteristic chemical changes (such as the different specific chemical reactions of sugar molecules, prepared by controlled breaking up of the starch molecules) which can be correlated with the known structural parameters of these molecules, and in turn related to the cutting-edge sharpness of the knife.

It is important to emphasize that there is very close correlation and excellent agreement between the results of the different methods described here for determination of the dimensions and properties of these ultrasharp cutting edges.

(d) Examination of ultrasharp edges by ion-optical, field emission and electrical measurement techniques.— One of the most interesting analytical approaches in the study of ultrasharp cutting edges, particularly of diamond, which is being actively investigated by the applicant, derives from the application of point-projection microscopes. This type of microscope, as first described by E. Mueller, consists of a sharp metal cathode (e.g. very fine tungsten point with a radius of only a few hundred Angstroms) located in a highly evacuated or gas-filled tube with the fluorescent screen and an interposed anode ring at a specified distance. With a sufficiently high potential (usually of 10 to 20 kv.) between anode and point electrons or ionized helium atoms will be drawn from the point and imaged directly on the screen displaying the atomic structure of the point at magnifications of several million. The magnification can be readily calculated as a function of the radius of the cathode and the distance to the screen. A diamond ultrasharp edge of 10 to 100 A. which is coated with tungsten or platinum by high vacuum evaporation can be actually considered as an extended point source in such a point projection microscope. Experiments demonstrate in fact that such a diamond knife edge is an excellent point source which gives exceptionally bright images both in the field emission and in the field ion microscope. From these images the dimensions of the emitting area which correspond to the active cutting edge of the knife can be determined. Moreover, as shown by the classic work of E. Mueller, this technique permits in principle a very accurate determination of the atomic structure of these emitting tips, investigation of crystalline defects and other important properties. Systematic work in this field combined with investigation of the characteristic electron-optical and electrical field properties exhibited by ultrasharp stable edges of these dimensions are of great potential value for automated inspection of ultrasharp cutting edges of all kinds.

NOTES (1) U.S. Patent No. 2,961,908—H. Fernández-Morán Villalobos dated November 29, 1960.

(2) U.S. Patent No. 3,060,781—H. Fernández-Morán Villalobos dated October 30, 1962.

(3) U.S. Patent No. 3,091,144—H. Fernández-Morán Villalobos dated May 28, 1963.

(4) B. M. Siegel, Modern Developments in Electron Microscopy (page 134), Academic Press, N.Y. (1964).

(5) F. H. Broome and V. M. Hovis, Precision Turning AEC Research and Development Report (Y–1463) Union Carbide Corporation, Nuclear Division (1965).

(6) P. Albrecht, Transactions of American Society of Mechanical Engineers, 82, Sec. 1, (page 348) (1960).

What I claim is:

1. A method for accurately determining the dimensions and characteristics of cutting tools having ultrasharp cutting-edges of molecular dimensions with a cutting-edge radius of 0.001 to 1 micron and adjacent smooth facets defining angles of about 40° to 80°, which comprises direct examination of the cutting-edge by high resolution light microscopy, electron microscopy and related electron-optical techniques in a nondestructive way comprising the steps of: mounting said cutting tool in a suitably adapted holder which permits the tool to be accurately positioned and oriented at optimum angles for light microscopy, preferably using light sources of high intensity for dark field and interference microscopy, thereafter introducing said holder with said cutting tool into the high vacuum chamber of a high resolution electron microscope operating at accelerating voltages of the order of 5 to 100 kv. and provided with a pointed filament source to produce coherent electron microbeam illumination, said electron microbeam having a diameter of the order of 0.01 to 1 micron and an intensity of the order of $10^{-4}$ to $10^{-4}$ amperes per square centimeter to avoid specimen irradiation damage, said beam passing only through the active ultrasharp cutting-edge which is thin enough for direct imaging on a fluorescent screen or image intensifier, and photographic recording of transmission electron micrographs at electron-optical magnifications ranging from 2000 to about 200,000 times, and of the corresponding electron diffraction patterns, and examining said electron micrographs and diffraction patterns for determination and evaluation of the regularity and critical dimensions of the ultrasharp cutting-edge.

2. A method according to claim 1, further comprising focusing said beam and orienting said cutting tool to produce a shadow image of the profiile of the cutting-edge and adjacent facets of said cutting tool at magnifications of about 100 to 10,000 times adequate to resolve fine details of the cutting-edge of the order of a few hundred Angstrom units.

3. A method according to claim 1, further comprising examination of the surface of the cutting tool facets and active cutting-edge by reflection electron microscopy using oblique illumination and tilting the cutting tool so that said beam makes a very small angle with said facets.

4. A method for accurately determining the dimensions and characteristics of a cutting tool having an ultrasharp cutting-edge of molecular dimensions and having a facet, which comprises moving said cutting tool in a direction lengthwise of said edge in proximity to a slit micro-aperture extending parallel to said edge, directing a collimated highly coherent electron microbeam of low energy spread and low intensity through said slit micro-aperture and through said facet of said cutting-edge so that electrons are transmitted selectively through said cutting-edge in accordance with the characteristics of said edge and continuously recording the transmitted electrons on a sensitive detector, such as an electron image intensifier.

5. A method for determination of the surface characteristics of the cutting-edge facettes and the relation of said facettes to the active cutting-edge radius of a cutting tool, which comprises providing atomically smooth carbon-plastic thin film, supporting said film on a liquid or a soft plastic substrate, mounting said cutting tool in a suitable holder moving said tool toward said film to engage the cutting-edge perpendicularly with said film and thereby form in said film an indentation track of said cutting-edge, removing said tool from said film and removing said film from said substrate and thereafter examining said indentation track by high resolution microscopy.

6. A method for determination of the surface characteristics of the cutting-edge facettes and the relation of said facettes to the active cutting-edge radius of a cutting tool, which comprises providing a smooth soft plastic surface, mounting said cutting tool in a suitable holder, moving said tool toward said surface to engage the cutting-edge perpendicularly with said surface and thereby form in said surface a controlled low-load indentation, removing the cutting tool from said surface, immediately shadow-casting an ultrathin carbon film deposited under high vacuum on said surface and in said indentation to form a replica of said cutting-edge, removing said film from said surface and thereafter examining said replica by high resolution electron microscopy.

7. A method of determining the characteristics of cutting tools having ultrasharp cutting-edge of molecular dimensions with a cutting-edge radius of 0.001 to 0.01 micron and adjacent smooth facettes defining angles of about 40° to 80°, which comprises mounting said cutting tool in a suitable holder, mounting a specimen in a suitable holder, producing accurately controlled relative movement between said tool and specimen to cut from said specimen ultrathin sections having a thickness of the order of 50 to 500 Angstrom units, and thereafter examining said sections and the cut surface of said specimen by high resolution electron microscopy and electron diffraction studies.

8. A method according to claim 7, in which said specimen and its holder are cooled to a temperature below about −180° C. for sectioning of said specimen and the surrounding atmosphere is maintained at a temperature between −15° C. and −269° C.

9. A method according to claim 7, in which said specimen is a metal selected from the group consisting of aluminum, copper, gold, zinc, platinum, germanium and titanium.

10. A method for determining the characteristics of cutting tools having ultrasharp cutting-edges which comprises mounting said cutting tool as a cathode in a high vacuum chamber or gas-filled tube having a fluorescent screen and an interposed anode ring disposed at selected distances from said cutting tool, with the edge of said cutting tool facing toward said screen, applying between said cutting tool and anode a sufficiently high potential to produce directly on said screen an image of said cutting-edge and examining said image from said cutting-edge to determine the characteristics of said cutting-edge.

11. A method according to claim 10, in which said cutting tool is of diamond and in which said cutting-edge is vacuum-evaporation-coated with metal.

References Cited

UNITED STATES PATENTS 3,162,767   12/1964   Curcio et al. _____ 73—104 X

OTHER REFERENCES

General Electric news release of October 8, 1948, entitled Electron Diffraction Instrument Studies Metal Surfaces.

RICHARD C. QUEISSER, *Primary Examiner.*

E. D. GILHOOLY, *Assistant Examiner.*